(12) United States Patent
Kobayashi et al.

(10) Patent No.: US 8,870,222 B2
(45) Date of Patent: Oct. 28, 2014

(54) GAS GENERATOR

(71) Applicant: Daicel Corporation, Osaka (JP)

(72) Inventors: Tomoharu Kobayashi, Tatsuno (JP); Masayuki Yamazaki, Tatsuno (JP)

(73) Assignee: Daicel Corporation, Osaka-Shi (JP)

(*) Notice: Subject to any disclaimer, the term of this patent is extended or adjusted under 35 U.S.C. 154(b) by 0 days.

(21) Appl. No.: 14/167,701

(22) Filed: Jan. 29, 2014

(65) Prior Publication Data

US 2014/0208975 A1 Jul. 31, 2014

Related U.S. Application Data

(60) Provisional application No. 61/758,496, filed on Jan. 30, 2013.

(30) Foreign Application Priority Data

Jan. 30, 2013 (JP) ................................. 2013-015406

(51) Int. Cl.
*B60R 21/26* (2011.01)

(52) U.S. Cl.
USPC ........................................... 280/736; 280/737

(58) Field of Classification Search
CPC .. B06R 21/274; B06R 21/272; B06R 21/268; B06R 21/26
USPC .................... 280/736, 737, 740, 741
See application file for complete search history.

(56) References Cited

U.S. PATENT DOCUMENTS

| | | | |
|---|---|---|---|
| 6,010,153 A | 1/2000 | Halas et al. | |
| 6,234,522 B1 | 5/2001 | Albrecht et al. | |
| 7,192,052 B2 | 3/2007 | Smith et al. | |
| 7,845,679 B2 * | 12/2010 | Abaziou | 280/736 |
| 2002/0074787 A1 | 6/2002 | Anacker et al. | |
| 2003/0151241 A1 | 8/2003 | Matsuda et al. | |
| 2006/0037662 A1 | 2/2006 | Fink | |

FOREIGN PATENT DOCUMENTS

| | | |
|---|---|---|
| JP | 10-230814 A | 9/1998 |
| JP | 10-278724 A | 10/1998 |
| JP | 2002-504046 A | 2/2002 |
| JP | 2002-513347 A | 5/2002 |
| JP | 2003-226222 A | 8/2003 |
| JP | 2010-18132 A | 1/2010 |

* cited by examiner

*Primary Examiner* — Faye M. Fleming (74) *Attorney, Agent, or Firm* — Birch, Stewart, Kolasch & Birch, LLP (57) ABSTRACT

A gas generator includes, an ignition device chamber housing, a pressurized gas chamber housing, a closing member closing a boundary surface between the ignition device chamber housing and the pressurized gas chamber housing, a plenum chamber enclosed by the ignition device chamber housing having a gas discharge port facing thereto, a gas generating agent charging chamber, a multifunctional member disposed inside the ignition device chamber housing and including, a base plate portion, and a wall portion extending from one surface of the base plate portion and including an inclined end surface inclined with respect to the base plate portion, and a movement restriction member restricting a moving distance in an axial direction of the multifunctional member before and after activation such that a longest portion of the cylindrical wall portion passes through the closing member but a shortest portion thereof does not pass through the closing member.

14 Claims, 5 Drawing Sheets

GAS GENERATOR

This nonprovisional application claims priority under 35 U.S.C. §119(a) to Patent Application No. 2013-015406 filed in Japan on 30 Jan. 2013, and 35 U.S.C. §119(e) to U.S. Provisional Patent Application No. 61/758,496 filed on 30 Jan. 2013, both of which are incorporated by reference.

BACKGROUND OF INVENTION

1. Field of Invention

The present invention relates to a gas generator used in a restraining device of an airbag system for a vehicle or the like.

2. Description of Related Art

A gas generator that uses a pressurized gas generally employs a structure in which an opening portion of a bottle in which the pressurized gas is sealed is closed by a closing member and the pressurized gas is discharged by rupturing the closing member during activation.

Furthermore, it is desirable that the gas generator employs such a structure that the time elapsed from activation (for example, when an ignition current flows in an electric igniter) until the start of gas discharge is decreased as much as possible and the pressurized gas can be discharged quickly (a restraining device or the like is activated quickly).

US-A No. 2006/037662 discloses a gas generator that uses a pressurized gas, in which an initiator 20 is attached to one end of a housing 16, and a projectile 22 is attached to a cylindrical body 82 filled with an ignition charge. A chamber 38 filled with a pressurized gas and the initiator 20 are separated from each other by a closure member 14, and the projectile 22 abuts against the closure member 14.

U.S. Pat. No. 7,192,052 discloses a gas generator that uses a pressurized gas, in which the gas filled in a bottle 14 is sealed by a burst disc 84 attached to an opening 82. Moreover, chamber opener assembly 90 is disposed in the burst disc 84.

The opener assembly 90 has a needle 94 at a tip end thereof. When an initiator 32 ignites to effect ignition of a gas generant pyrotechnic material 54, the opener means assembly 90 moves and the needle 94 passes through the burst disc 84. The tip end of the needle 94 is a hollow tubular member of which the periphery is inclined.

SUMMARY OF INVENTION

The present invention provides a gas generator, including:
a cylindrical ignition device chamber housing provided with a gas discharge port, and accommodating therein an igniter and a gas generating agent, the igniter closing an opening portion of the ignition device chamber housing and being fixed thereto;
a cylindrical pressurized gas chamber housing filled with pressurized gas, and being joined to the cylindrical ignition device chamber housing to form an outer-shell container;
a closing member closing a boundary surface between the ignition device chamber housing and the pressurized gas chamber housing;
a multifunctional member, movable in an axial direction during activation, being disposed inside the ignition device chamber housing together with the igniter and the gas generating agent, the multifunctional member having,
  a base plate portion, and
  a cylindrical wall portion extending from one surface of the base plate portion, an annular end surface of an opening portion of the cylindrical wall portion including an inclined end surface inclined with respect to the base plate portion, the multifunctional member being provided such that the inclined end surface is not in contact with the closing member,
the multifunction member moving in the axial direction by internal pressure increase due to combustion gas generated by combustion of the gas generating agent to break the closing member with the inclined end surface of the cylindrical wall portion, and thereby, obtaining a gas discharge path;
a plenum chamber being enclosed by the ignition device chamber housing, the base plate portion and the closing member, and being provided such that the gas discharge port is formed in a circumferential wall portion of the ignition device chamber housing facing the plenum chamber;
a gas generating agent charging chamber charged with the gas generating agent, enclosed by the base plate portion, the igniter and an inner wall surface of the ignition device chamber housing, the gas generating agent charging chamber and the plenum chamber communicating with each other; and
a movement restriction means restricting a moving distance in the axial direction of the multifunctional member before and after activation such that a longest portion of the cylindrical wall portion passes through the closing member but a shortest portion of the cylindrical wall portion does not pass through the closing member.

BRIEF DESCRIPTION OF DRAWINGS

The present invention will become more fully understood from the detailed description given hereinbelow and the accompanying drawings which re give by way of illustration only, and thus are no limitative of the present invention and wherein.

DETAILED DESCRIPTION OF INVENTION

In the gas generator disclosed in US-A No. 2006/037662, activation of the initiator 20 causes the projectile 22 to move and rupture the closure member 14, whereby the pressurized gas is discharged to the outside from a gas outlet 18. However, since the gas is not discharged unless the closure member 14 is ruptured, the time elapsed from activation (activation of the igniter 20) until the gas is discharged may become prolonged. In this regard, there is still room for further improvement.

In this gas generator disclosed in U.S. Pat. No. 7,192,052, there is a possibility that, when the needle 94 passes through the burst disc 84, portions of the burst disc 84 through which the needle 94 passes may become fragments, and the fragments may flow outside the bottle 14 with the flow of the gas.

The invention includes preferably an aspect of the above shown invention having a gas generator including:
a cylindrical ignition device chamber housing provided with a gas discharge port, accommodating an igniter and a gas generating agent, a cylindrical pressurized gas chamber housing filled with pressurized gas, the ignition device chamber housing joining to the pressurized gas chamber housing to form an outer container, a closing member closing between the ignition device chamber housing and the pressurized gas chamber housing, a multifunctional member, movable in the axial direction during activation, being disposed inside the ignition device chamber housing together with the igniter and the gas generating agent, the igniter closing the opening portion of the ignition device chamber housing and being fixed thereto, the multifunctional member having a base plate portion and a cylindrical wall portion extending from one surface of the base plate portion, an annular end surface of the opening portion of the cylindrical wall portion including an inclined end surface inclined with respect to the base plate portion, the inclined end surface being arranged not in contact with the closing member, a plenum chamber, being enclosed by the ignition device chamber housing, the base plate portion and the closing member, the gas discharge port formed in a circumferential wall portion, of the ignition device chamber housing, to face the plenum chamber, a gas generating agent charging chamber, charged with a gas generating agent, enclosed by the base plate portion, the igniter and an inner wall surface of the ignition device chamber housing, the plenum chamber and the gas generating agent charging chamber communicating with each other, the multifunction member moving in the axial direction by internal pressure increase due to combustion gas generated by combustion of the gas generating agent in the gas generating agent charging chamber to break the closing member with the inclined end surface of the cylindrical wall portion, and thereby, obtaining a gas discharge path, and a movement restriction means restricting a moving distance in the axial direction of the multifunctional member before and after activation such that the longest portion of the cylindrical wall portion passes through the closing member but the shortest portion of the cylindrical wall portion does not pass through the closing member.

The present invention provides a gas generator capable of maintaining high performance during the service life of a vehicle and discharging gas in an earlier initial stage of activation without producing fragments of a closing member when applied to a restraining device of an airbag system of a vehicle or the like.

The multifunctional member used in the gas generator according to the present invention functions to rupture the closing member, to hold the gas generating agent, and to secure the gas discharge path.

The multifunctional member has the base plate portion and the cylindrical wall portion extended from one surface of the base plate portion. Moreover, an end of the cylindrical wall portion on an opposite side of the base plate portion is an opening portion having an inclined end surface.

The presence of the multifunctional member enables to exhibit functions (I) and (II) below, and additionally a function (III).

(I) Function to Rupture Closing Member

Before activation (before activation of an ignition device; the same applies hereinafter), the pressurized gas chamber housing is filled with a pressurized gas under high pressure.

During activation, the multifunctional member (the base plate portion and the cylindrical wall portion having the inclined end surface) is moved in the axial direction (toward the closing member), whereby the closing member is ruptured by the inclined end surface of the opening portion of the cylindrical wall portion and the flow path for the pressurized gas is opened.

Since the cylindrical wall portion has the inclined end surface on the opening portion thereof, the cylindrical wall portion has a longest portion and a shortest portion. Although the longest portion of the inclined end surface has a sharp tip end, the shortest portion does not have a sharp tip end. During activation, the closing member is ruptured by the tip end of the longest portion.

In the gas generator of the present invention, the moving distance in the axial direction of the multifunctional member before and after activation is restricted by the movement restriction means such that the longest portion of the cylindrical wall portion passes through the closing member, but the shortest portion of the cylindrical wall portion does not pass through the closing member.

Due to this, when the multifunctional member is moved so that the longest portion (the portion having the sharp tip end) of the inclined end surface collides with and passes through the closing member, the closing member is ruptured. However, since the shortest portion of the inclined end surface does not pass through the closing member, a portion of the closing member remains in a non-ruptured state.

Thus, since the non-ruptured portion remains fixed to the closing member, the portions of the closing member ruptured by the sharp tip end remain in a state of being turned up toward the pressurized gas chamber housing.

Due to this, there is no possibility that small fragments of the closing member scatter or the entire closing member is displaced to block the gas discharge path.

The form of the closing member is not particularly limited as long as the closing member closes the space between the ignition device chamber housing and the pressurized gas chamber housing.

The closing member can be a disc member (for example, a rupture plate 40 in FIG. 3 of JP-A No. 2003-226222) that is welded and fixed, from the pressurized gas chamber housing side, to an annular plate portion (an annular protrusion) that protrudes inward from one of the ignition device chamber housing and the pressurized gas chamber housing.

The disc member serving as the closing member is deformed in a bowl-like shape that protrudes toward the ignition device chamber housing by receiving pressure from the inside of the pressurized gas chamber housing. In this case, the multifunctional member is disposed so that the inclined end surface does not make contact with the closing member.

The closing member can be also a bottom plate member (for example, a rupture plate 10 in FIG. 4 of JP-A No. 2010-018132) that is formed to be integrated with one of the ignition device chamber housing and the pressurized gas chamber housing such that a central portion thereof is ruptured during activation and a peripheral portion thereof remains in a state of being integrated with one of the ignition device chamber housing and the pressurized gas chamber housing (in the same form as the annular plate portion described above). A fragile portion may be formed in the central portion.

The movement restriction means may be configured such that one or both of the base plate portion and the cylindrical wall portion of the multifunctional member makes contact with another member to stop movement of the multifunctional member. For example, a protrusion may be formed on the base plate portion, the cylindrical wall portion and the ignition device chamber housing so that these protrusions make contact with each other to suppress movement of the multifunctional member.

(II) Function to Secure Gas Discharge Path

The base plate portion abuts against the inner wall surface of the ignition device chamber housing, and the cylindrical wall portion has an outer diameter smaller than an outer diameter of the base plate portion.

By disposing such a multifunctional member in the ignition device chamber housing, the plenum chamber is formed. The cylindrical wall portion of the multifunctional member is positioned in the plenum chamber.

The plenum chamber communicates with the gas generating agent charging chamber that is charged with the gas generating agent.

During activation, a discharge path of the combustion gas generated in the ignition device chamber housing and a discharge path of the pressurized gas are secured. The gas generating agent charging chamber and the plenum chamber may communicate with each other before activation.

The size of the communicating portion that makes communication between the gas generating agent charging chamber and the plenum chamber is set to such an opening area that the combustion gas generates a gradient in pressure between the gas generating agent charging chamber and the plenum chamber.

Since the combustion gas is immediately discharged to the outside of the housing through the plenum chamber, an airbag can be inflated in a reliable and quick manner. At the same time, the multifunctional member is moved by pressure by the combustion gas to rupture the closing member.

In the present invention, since the opening portion of the cylindrical wall portion of the multifunctional member has the inclined end surface, the gas may flow directly into the plenum chamber through the gap between the shortest portion and the portion of the closing member turned up toward the pressurized gas chamber housing to be discharged from the gas discharge port.

(III) Function to Hold Gas Generating Agent

The function to hold the gas generating agent may be obtained by the multifunctional member used in the gas generator according to the present invention or may be obtained by another member. The function to hold the gas generating agent may be exhibited by the multifunctional member as follows:

Before activation, one surface of the gas generating agent charging chamber is formed by the base plate portion of the multifunctional member and the charged gas generating agent is supported and fixed.

When the gas generator is mounted on a vehicle, vibration is applied to the gas generator over a long period of time. If the gas generating agent is insufficiently fixed, the gas generating agents may rub against each other and become pulverized.

When the gas generating agent is pulverized in this manner, a designed combustion state is not obtained and the performance of the gas generator is also affected.

In the present invention, when the gas generating agent is directly or indirectly supported and fixed by the multifunctional member, pulverization of the gas generating agent is prevented by the multifunctional member.

In order to exhibit the functions (I) and (II), or in order that the annular end surface of the opening portion of the cylindrical wall portion of the multifunctional member is the inclined end surface that is inclined with respect to the base plate portion, the multifunctional member used in the gas generator of the present invention is preferably configured as follows:

the ratio between a smallest length (Lmin) to a largest length (Lmax), Lmin/Lmax, of the cylindrical wall portion is preferably in a rage of 20% and 75%, and more preferably, in a rage of 30% and 60%;

a part of the inclined end surface is depressed toward the base plate portion; or the inclined end surface has a wavy convex and concave surface.

In order to exhibit the functions (I) and (II), the gas generator of the present invention preferably includes at least one of the followings as the movement restriction means for the multifunctional member.

(1) The inner wall surface of the ignition device chamber housing has a first protrusion and a second protrusion formed at an interval in the axial direction so as to protrude inward, before activation, the multifunctional member is disposed in the ignition device chamber housing so that the base plate portion abuts against the first protrusion, during activation, movement of the base plate portion is restricted within a moving distance from the first protrusion to the second protrusion, and the first protrusion is an inward protrusion formed in a circumferential wall portion of the ignition device chamber housing so as to be recessed from the outside, and the second protrusion is a step formed on the circumferential wall portion of the ignition device chamber housing facing the plenum chamber.

Movement of the multifunctional member is restricted within the range of the first protrusion and the second protrusion, and the closing member is ruptured by the multifunctional member that has moved within this restricted range.

(2) The closing member that closes a boundary surface between the ignition device chamber housing and the pressurized gas chamber housing has or is attached to an annular plate portion that is integrated with an inner wall surface of either the ignition device chamber housing or the pressurized gas chamber housing, the cylindrical wall portion has an inclined end surface on the opening portion, inclined with respect to the base plate portion, a protrusion is formed on an outer wall surface of the longest portion of the cylindrical wall portion so as to protrude outward, and the protrusion collides with an annular plate portion that protrudes inward from an inner wall surface of either the ignition device chamber housing or the pressurized gas chamber housing, so that movement of the multifunctional member in the axial direction is restricted.

(3) The closing member that closes a boundary surface between the ignition device chamber housing and the pressurized gas chamber housing is integrated with an inner wall surface of either the ignition device chamber housing or the pressurized gas chamber housing, a central portion of the closing member is ruptured and opened during activation, and an annular portion around the central portion remains in a state of being integrated with either the ignition device chamber housing or the pressurized gas chamber housing, the cylindrical wall portion has an inclined end surface on the opening portion, inclined with respect to the base plate portion, a protrusion is formed so as to protrude outward from an outer wall surface of the longest portion of the cylindrical wall portion, and the protrusion collides with the remaining annular portion, so that movement of the multifunctional member in the axial direction is restricted.

By using a novel multifunctional member as a constituent component, the gas generator according to present invention maintains high performance during a service life of a vehicle when applied to a restraining device of an airbag system of the vehicle or the like.

Figure 1:
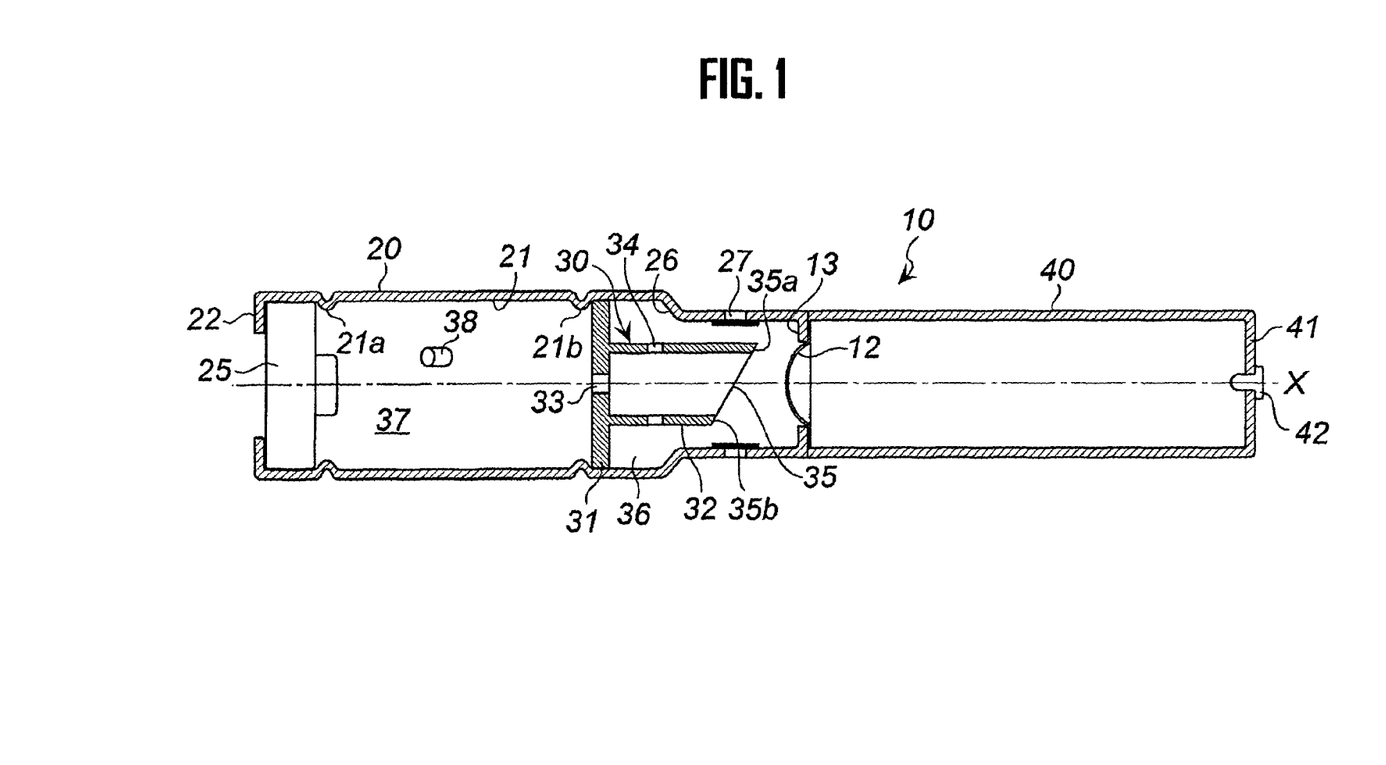
FIG. 1 shows a cross-sectional view in the axial direction of a gas generator according to the present invention.
Figure 2:
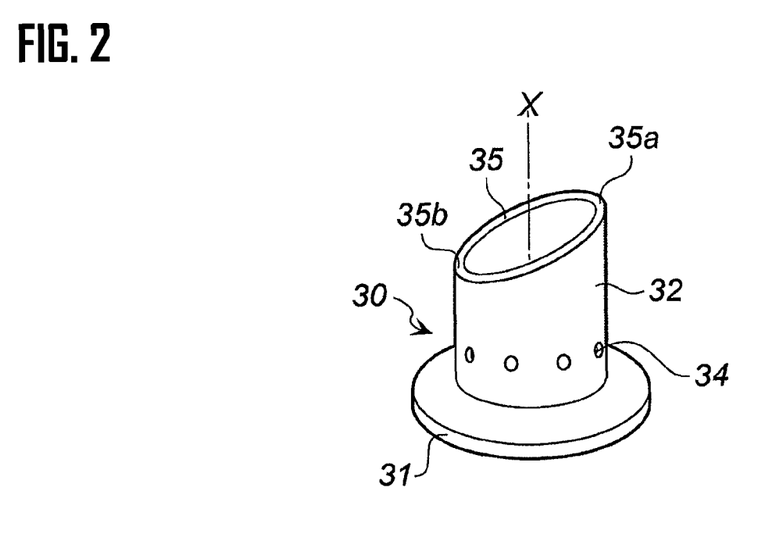
FIG. 2 shows a perspective view of a multifunctional member of FIG. 1.
Figure 3:
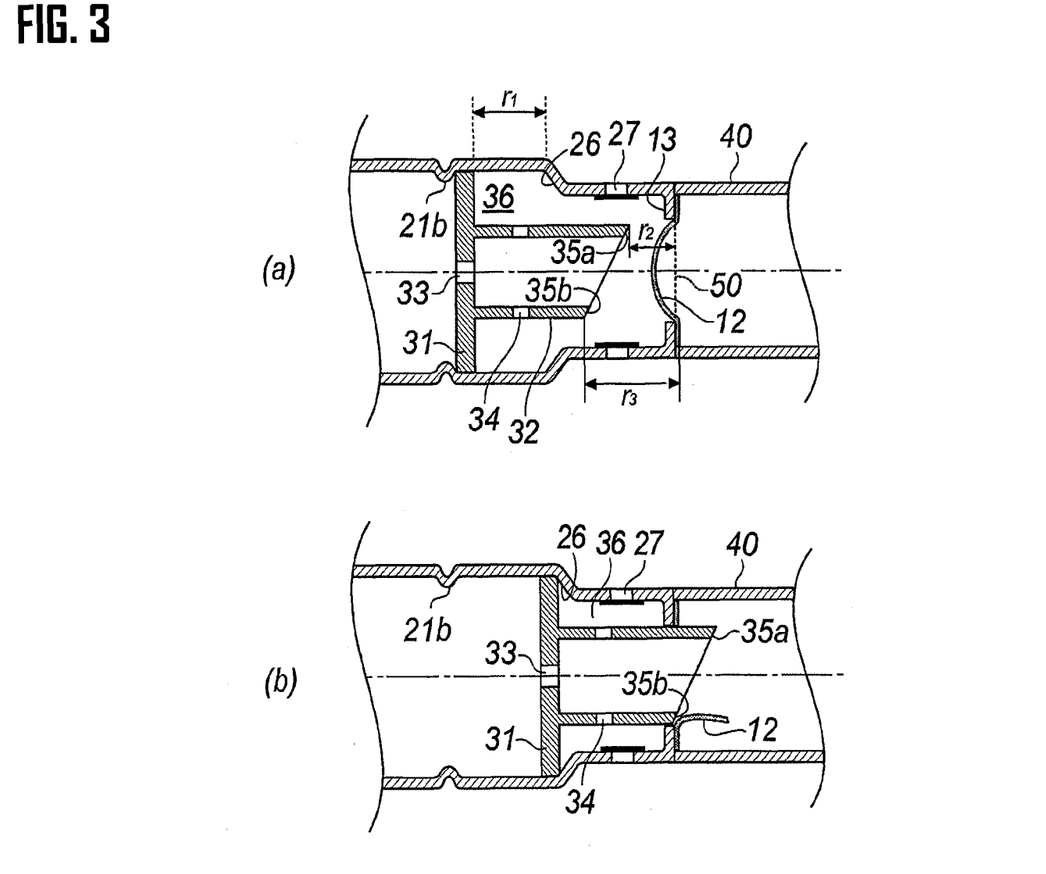
FIG. 3, in (a) and (b), shows a partial cross-sectional view illustrating an activation, before and after, of the gas generator of FIG. 1.

DESCRIPTION OF EMBODIMENTS (1) Gas Generator Illustrated in FIGS. 1 to 3

A gas generator 10 includes an ignition device chamber housing 20 and a pressurized gas chamber housing 40 which are connected to form an outer-shell container.

A closing member 12 closes between the ignition device chamber housing 20 and the pressurized gas chamber housing 40.

A circumference edge of the closing member 12 is welded and fixed, from the pressurized gas chamber housing 40, to an annular plate portion 13 that protrudes inward from an inner wall surface of the ignition device chamber housing 20. The annular plate portion 13 may be one that protrudes inward from the inner wall surface of the pressurized gas chamber housing 40.

The closing member 12 may be one that is integrated with one of the ignition device chamber housing 20 and the pressurized gas chamber housing 40 (for example, a bottom plate member of any one of the housings).

The closing member 12 has a disc shape (a flat-plate shape) before assembling, and is deformed in a bowl-like shape in response to pressure of a pressurized gas inside the pressurized gas chamber housing 40.

An opening portion (the opening portion opposite to the closing member 12) of the ignition device chamber housing 20 is closed by an electric igniter 25 fixed thereto.

The electric igniter 25 fixed to a collar is fixed by being held from both sides in the X-axis direction by an inward annular protrusion 21a formed on an circumferential wall portion 21 of the ignition device chamber housing 20 and an opening end portion 22 crimped inward.

A multifunctional member 30 having the functions (I) to (III) described above is arranged in the ignition device chamber housing 20.

The multifunctional member 30 has a base plate portion and a cylindrical wall portion 32 extended from one surface of the base plate portion 31.

The base plate portion 31 is movable and in contact with the inner wall surface (circumferential wall portion) 21 of the ignition device chamber housing 20, and has a first through-hole 33 in a thickness direction thereof. The first through-hole 33 may be closed by an aluminum adhesive tape or the like that is readily broken.

In FIG. 1, the first through-holes 33 are formed at the center of the base plate portion 31 to enable communication with the inner space (a plenum chamber 36) of the cylindrical wall portion 32. However, the first through-holes 33 may be formed near the peripheral edge of the base plate portion 31 to enable communication with the plenum chamber 36.

The number of the first through-hole 33 is not particularly limited. Moreover, a recess may be formed in the peripheral edge of the base plate portion 31 to form a gap between the recess and the inner wall surface 21 of the ignition device chamber housing 20, so that the gap serves as the first through-hole.

The cylindrical wall portion 32 has the same central axis X as the base plate portion 31, and an outer diameter of the cylindrical wall portion 32 is smaller than an outer diameter of the base plate portion 31.

The cylindrical wall portion 32 has a plurality of second through-holes 34 in the thickness direction thereof.

An annular end surface (an end surface close to the closing member 12) of the opening portion of the cylindrical wall portion 32 is configured as an inclined end surface 35 that is inclined with respect to the base plate portion 31.

The cylindrical wall portion 32 having the inclined end surface 35 has the longest portion 35a and the shortest portion 35b, and a tip end portion including the longest portion 35a has a sharp edge. The length between the tip of the longest portion and the base plate portion is a largest length (Lmax). The length between the tip of the shortest portion and the base plate portion is a smallest length (Lmin). The ratio of the length (Lmin) of the shortest portion 35b to the length (Lmax) of the longest portion 35a of the cylindrical wall portion 32 is between 20% and 75%.

In FIG. 2, although the inclined end surface 35 is a continuous inclined end surface (the cross-section of the end surface is an inclined straight line), a portion (one or multiple portions) between the longest portion 35a and the shortest portion 35b may be depressed toward the base plate portion 31.

The inclined end surface 35 (the longest portion 35a) of the cylindrical wall portion 32 is not in contact with the closing member 12 before activation.

A protrusion (a first protrusion) 21b is formed on the inner wall surface 21 of the ignition device chamber housing 20. Before activation, the base plate portion 31 of the multifunctional member 30 abuts against the protrusion (the first protrusion) 21b to prevent movement toward the igniter 25.

Although not illustrated in the drawings, the multifunctional member 30 is temporarily clamped by a temporary fixing means, so that the multifunctional member does not move toward the closing member 12 before activation (that is, the multifunctional member 30 does not move in response to vibration from a vehicle to which the gas generator is attached) and that the multifunctional member 30 is ruptured by moving toward the closing member 12 in response to the pressure of the combustion gas during activation.

An example of the temporary fixing means can be a protrusion which holds the base plate portion 31 together with the protrusion (the first protrusion) 21b in the thickness direction, in which the inwardly protruding length of the protrusion is smaller than the protrusion (the first protrusion) 21b and the width of the protrusion is smaller than the protrusion 21b.

In addition to this, a shallow and narrow annular groove may be formed on the circumferential surface of the base plate portion 31, and a protrusion corresponding to the annular groove on the circumferential surface may be formed on the inner wall surface 21 so that a combination of the annular groove and the protrusion provides the temporary fixing function.

In a portion of the inner wall surface 21 of the ignition device chamber housing 20, a step (a second protrusion) 26 is arranged between the first protrusion 21b and the closing member 12.

A combination of the first protrusion 21b and the step (the second protrusion) 26 forms a movement restriction means that restricts a moving distance (a moving range) of the multifunctional member 30 in the X-axis direction.

The moving distance (r1 in (a) in FIG. 3) restricted by the combination of the protrusion (the first protrusion) 21b and the step (the second protrusion) 26 is set to such a distance that the longest portion 35a of the cylindrical wall portion 32 passes through the closing member 12, preferably, passes through a boundary surface 50 between the closing member 12 and the annular plate portion 13 (to move a distance of r2 or more) and that the shortest portion 35b of the cylindrical wall portion 32 does not pass through the boundary surface 50 (to move a distance equal to r3 or smaller).

Here, the boundary surface 50 is an imaginary surface that passes through the boundary between the closing member 12 and the annular plate portion 13.

Here, r1, r2, and r3 satisfy a relation of r1>r2 and r1<r3, and can be adjusted appropriately within such a range that the relation is satisfied.

For example, r1/r2 may be set between 1.3 and 4, and r3/r1 may be set between 1.3 and 4.

A plurality of gas discharge ports 27 is formed, between the step 26 and the closing member 12, in the inner wall surface 21 of the ignition device chamber housing 20. For moisture-proofing, the plurality of gas discharge ports 27 is closed from the inside by an aluminum adhesive tape or the like.

In the ignition device chamber housing 20, the space enclosed by the base plate portion 31, the inner wall surface 21, and the closing member 12 is the plenum chamber that forms the gas discharge path. Since the cylindrical wall portion 32 is positioned inside the plenum chamber 36, both the inside and the outside of the cylindrical wall portion 32 are the plenum chamber 36. The gas discharge port 27 faces the plenum chamber 36.

The space enclosed by the base plate portion 31, the igniter 25, and the inner wall surface 21 is a gas generating agent charging chamber 37, and a molded article of known gas generating agent 38 is charged in the gas generating agent charging chamber 37.

An amount of the molded article of the gas generating agent 38 used is determined appropriately according to the type of the gas generator.

The pressurized gas chamber housing 40 is filled with a gas such as argon or helium under high pressure.

The gas is filled from a gap between a pore and a pin 42 inserted into the pore on a bottom surface 41. After the gas is filled, the pore is closed by welding the bottom surface 41 and the pin 42.

Operations of the gas generator (a hybrid-type gas generator) illustrated in FIG. 1 used in a restraining device of an airbag system for a vehicle will be described below.

When the igniter 25 is activated, the molded article of gas generating agent 38 in the gas generating agent charging chamber 37 is ignited and combusted to generate combustion gas.

The generated combustion gas immediately enters the plenum chamber 36 inside the cylindrical wall portion 32 through the first through-hole 33 and enters the plenum chamber 36 outside the cylindrical wall portion 32 through the second through-hole 34 to break the moisture-proofing seal tape. After that, the gas is discharged from the gas discharge port 27 to inflate an airbag.

Therefore, the gas can be quickly discharged with the activation of the gas generator and the activation (deployment) of a restraining device such as an airbag can be quickly started.

On the other hand, when the pressure in the gas generating agent charging chamber 37 rises due to the generation of the combustion gas, the base plate portion 31 of the multifunctional member 30 is pushed in the X-axis direction and the cylindrical wall portion 32 having the inclined end surface 35 is moved in the X-axis direction.

In this case, as illustrated in (a) and (b) in FIG. 3, the base plate portion 31 stops after moving from the protrusion (the first protrusion) 21b to the step (the second protrusion) 26. As a result, the longest portion 35a having a sharp edge passes through the boundary surface 50, whereby the closing member 12 is ruptured and opened from the annular plate portion 13 (r1>r2 in (a) in FIG. 3, and the inner diameter of the annular plate portion 13 is slightly larger than the outer diameter of the cylindrical wall portion 32).

In this case, although the shortest portion 35b also collides with the closing member 12, the shortest portion 35b does not pass through the boundary surface 50 (r1<r3 in (a) in FIG. 3), preferably, does not pass through the closing member 12, the shortest portion 35b does not have a sharp edge, and therefore, the closing member 12 that the shortest portion 35b faces is not ruptured.

When the multifunctional member 30 collides with the closing member 12 and the pressure inside the plenum chamber 36 has increased, the closing member 12 is ruptured to be turned up toward the pressurized gas chamber housing 40 as illustrated in (b) in FIG. 3. After that, since the gas inside the pressurized gas chamber housing 40 is discharged and the pressure decreases, the closing member 12 maintains this state.

The moving distance (r3) of the shortest portion 35b may be adjusted so that the shortest portion 35b abuts against the opened and turned-up closing member 12, or the moving distance (r3) may be adjusted so that a gap serving as the gas discharge path is formed between the shortest portion 35b and the opened and turned-up closing member 12.

Moreover, when a part (one or multiple portions) of the inclined end surface 35 of the cylindrical wall portion 32 is depressed toward the base plate portion 31, even if the moving distance (r3) is adjusted so that the shortest portion 35b abuts against the opened and turned-up closing member 12, the depression functions as the gas discharge path together with the second through-hole 34.

The gas inside the pressurized gas chamber housing 40 passes through an opening formed by the ruptured closing member 12, the second through-hole 34 and the plenum chamber 36 outside the cylindrical wall portion 32, and is discharged from the gas discharge port 27 to inflate an air bag.

The gas inside the pressurized gas chamber housing 40 can directly enter the plenum chamber 36 outside the cylindrical wall portion 32 and be discharged form the gas discharge port 27 to inflate the airbag.

Figure 4:
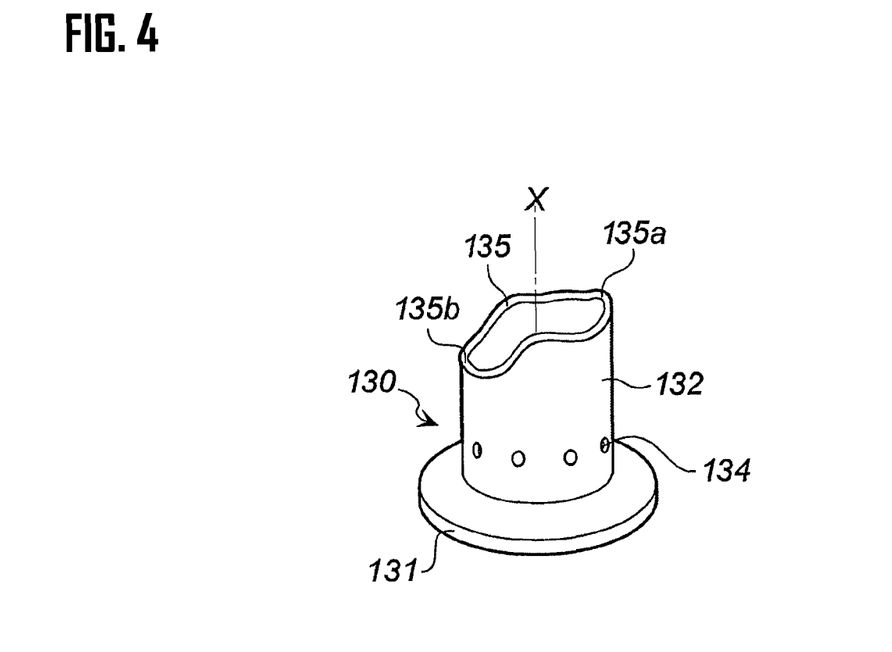
FIG. 4 is a perspective view of a multifunctional member according to another embodiment.

(2) Multifunctional Member of FIG. 4

FIG. 4 is a perspective view of a multifunctional member 130 used in a gas generator. The multifunctional member 130 has the same functions and operations as the multifunctional member 30 in FIG. 1 except that the multifunctional member 30 has a shape different from the inclined end surface 135.

The multifunctional member 130 has a base plate portion 131 and a cylindrical wall portion 132 extended from one surface of the base plate portion 131.

The base plate portion 131 has a first through-hole similarly to the base plate portion 31 of FIG. 1.

The cylindrical wall portion 132 has an inclined end surface 135 that has a wavy convex and concave surface, and has a longest portion 135a and a shortest portion 135b. A convex portion is formed between the longest portion 135a and the shortest portion 135b.

A concave portion of the inclined end surface 135 functions, together with the second through-hole 134, as a gas discharge path along which the gas is discharged from the pressurized gas chamber housing 40.

Figure 5:
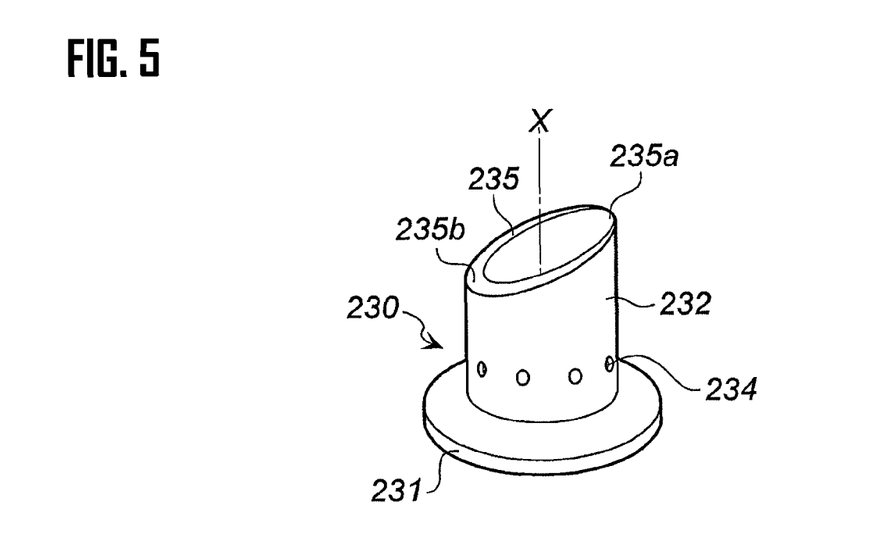
FIG. 5 is a perspective view of a multifunctional member according to still another embodiment.

(3) Gas Generator of FIG. 5

FIG. 5 is a perspective view of a multifunctional member 230 used in a gas generator.

The multifunctional member 230 has a base plate portion 231 and a cylindrical wall portion 232 extended from one surface of the base plate portion 231.

The base plate portion 231 has a first through-hole similarly to the base plate portion 31 in FIG. 1.

The cylindrical wall portion 232 has an opening end surface that is configured as an inclined end surface 235 and has a longest portion 235a and a shortest portion 235b.

In the cylindrical wall portion 232, the longest portion 235a has a smallest thickness and the shortest portion 235b has a largest thickness (Tmax).

A tip end of the longest portion 235a having the smallest thickness has a sharp edge and functions to rupture the closing member 12 when the multifunctional member 230 is moved in the X-axis direction during activation.

The shortest portion 235b having the largest thickness collides with the closing member 12 to restrict further movement of the multifunctional member 230 when the multifunctional member 230 is moved in the X-axis direction during activation.

Due to this, when the multifunctional member 230 shown in FIG. 5 is used in the gas generator in FIG. 1, the step that restricts the movement of the multifunctional member 230 may not be needed.

Figure 6:
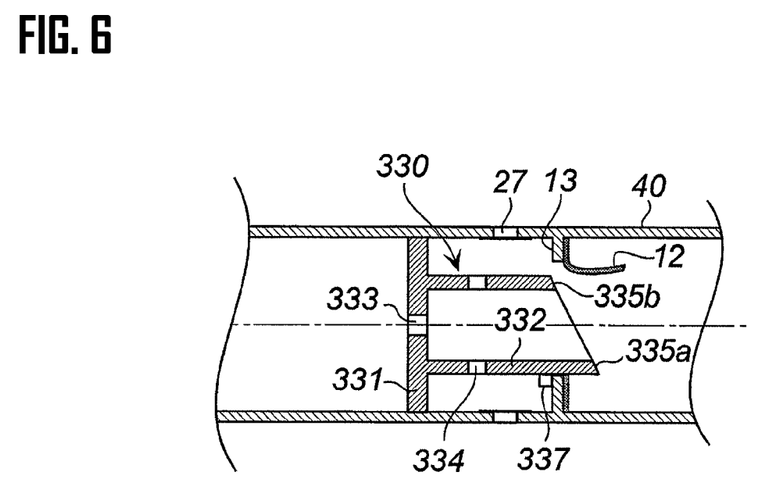
FIG. 6 is a partial cross-sectional view illustrating an activated state of a multifunctional member according to still another embodiment.

(4) Multifunctional Member of FIG. 6

FIG. 6 is a cross-sectional view in the axial direction of a multifunctional member 330 used in a gas generator.

The multifunctional member 330 has a base plate portion 331 and a cylindrical wall portion 332 extended from one surface of the base plate portion 331.

The base plate portion 331 has a first through-hole similarly to the base plate portion 31 in FIG. 1.

The cylindrical wall portion 332 has an opening end surface that is configured as an inclined end surface 335 and has a longest portion 335a and a shortest portion 335b.

A protrusion 337 protruding outward is formed on an outer wall surface of the longest portion 335a of the cylindrical wall portion 332.

The protrusion 337 collides with the annular plate portion 13 to which the closing member 12 is welded and fixed so as to restrict further movement of the multifunctional member 330 when the multifunctional member 330 is moved in the X-axis direction during activation.

Due to this, when the multifunctional member 330 shown in FIG. 6 is used in the gas generator in FIG. 1, the step that restricts the movement of the multifunctional member 330 may not be needed.

A specific embodiment of the gas generator according to the present invention is not limited to the present embodiment as long as the problem described above can be solved. For example, different embodiments can be adopted with respect to the shape of the multifunctional member, the annular protrusion and the step formed on the ignition device chamber housing, and the like in order to realize similar functions.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
 a cylindrical ignition device chamber housing provided with a gas discharge port, and accommodating therein an igniter and a gas generating agent, the igniter closing an opening portion of the ignition device chamber housing and being fixed thereto;
 a cylindrical pressurized gas chamber housing filled with pressurized gas, and being joined to the cylindrical ignition device chamber housing to form an outer-shell container;
 a closing member closing a boundary surface between the ignition device chamber housing and the pressurized gas chamber housing;
 a multifunctional member, movable in an axial direction during activation, being disposed inside the ignition device chamber housing together with the igniter and the gas generating agent, the multifunctional member having,
  a base plate portion, and
  a cylindrical wall portion extending from one surface of the base plate portion, an annular end surface of an opening portion of the cylindrical wall portion including an inclined end surface inclined with respect to the base plate portion, the multifunctional member being provided such that the inclined end surface is not in contact with the closing member,
 the multifunction member moving in the axial direction by internal pressure increase due to combustion gas generated by combustion of the gas generating agent to break the closing member with the inclined end surface of the cylindrical wall portion, and thereby, obtaining a gas discharge path;
 a plenum chamber being enclosed by the ignition device chamber housing, the base plate portion and the closing member, and being provided such that the gas discharge port is formed in a circumferential wall portion of the ignition device chamber housing facing the plenum chamber;
 a gas generating agent charging chamber charged with the gas generating agent, enclosed by the base plate portion, the igniter and an inner wall surface of the ignition device chamber housing, the gas generating agent charging chamber and the plenum chamber communicating with each other; and
 a movement restriction means restricting a moving distance in the axial direction of the multifunctional member before and after activation such that a longest portion of the cylindrical wall portion passes through the closing member but a shortest portion of the cylindrical wall portion does not pass through the closing member.

2. The gas generator according to claim 1, wherein
 the annular end surface of the opening portion of the cylindrical wall portion of the multifunctional member is the inclined end surface that is inclined with respect to the base plate portion, and
 the ratio between a smallest length (Lmin) to a largest length (Lmax), Lmin/Lmax, of the cylindrical wall portion is in a range of 20% and 75%.

3. The gas generator according to claim 1, wherein
 the annular end surface of the opening portion of the cylindrical wall portion of the multifunctional member is an inclined end surface that is inclined with respect to the base plate portion, and
 a part of the inclined end surface is depressed toward the base plate portion.

4. The gas generator according to claim 1, wherein
 the annular end surface of the opening portion of the cylindrical wall portion of the multifunctional member is an inclined end surface that is inclined with respect to the base plate portion, and
 the inclined end surface has a wavy convex and concave surface.

5. The gas generator according to claim 1, wherein
the inner wall surface of the ignition device chamber housing has a first protrusion and a second protrusion formed at an interval in the axial direction so as to protrude inward,
before activation, the multifunctional member is disposed in the ignition device chamber housing so that the base plate portion abuts against the first protrusion,
during activation, movement of the base plate portion is restricted within a moving distance from the first protrusion to the second protrusion.

6. The gas generator according to claim 5, wherein
the first protrusion is an inward protrusion formed in a circumferential wall portion of the ignition device chamber housing so as to be recessed from the outside, and
the second protrusion is a step formed on the circumferential wall portion of the ignition device chamber housing facing the plenum chamber.

7. The gas generator according to claim 1, wherein
the closing member that closes a boundary surface between the ignition device chamber housing and the pressurized gas chamber housing has or is attached to an annular plate portion that is integrated with an inner wall surface of either the ignition device chamber housing or the pressurized gas chamber housing,
the cylindrical wall portion has an inclined end surface on the opening portion, inclined with respect to the base plate portion,
a protrusion is formed on an outer wall surface of the longest portion of the cylindrical wall portion so as to protrude outward, and
the protrusion collides with an annular plate portion that protrudes inward from an inner wall surface of either the ignition device chamber housing or the pressurized gas chamber housing, so that movement of the multifunctional member in the axial direction is restricted.

8. The gas generator according to claim 1, wherein
the closing member that closes a boundary surface between the ignition device chamber housing and the pressurized gas chamber housing is integrated with an inner wall surface of either the ignition device chamber housing or the pressurized gas chamber housing, a central portion of the closing member is ruptured and opened during activation, and an annular portion around the central portion remains in a state of being integrated with either the ignition device chamber housing or the pressurized gas chamber housing,
the cylindrical wall portion has an inclined end surface on the opening portion, inclined with respect to the base plate portion,
a protrusion is formed so as to protrude outward from an outer wall surface of the longest portion of the cylindrical wall portion, and
the protrusion collides with the remaining annular portion, so that movement of the multifunctional member in the axial direction is restricted.

9. The gas generator according to claim 1, wherein
the base plate portion has a first through hole that allows the cylindrical ignition device chamber communicate with the plenum chamber.

10. The gas generator according to claim 9, wherein
the cylindrical wall portion defines an open space therein, and the first through hole allows the cylindrical ignition device chamber communicated with the open space.

11. The gas generator according to claim 10, wherein
the cylindrical wall portion defines at least one second through hole between the base plate and the opening portion, the second through hole allows the open space communicate with the plenum chamber.

12. The gas generator according to claim 11, wherein
the cylindrical wall portion defines a plurality of second through holes.

13. The gas generator according to claim 11, wherein
the at least one second through hole is defined at a position offset from the gas discharge port in a longitudinal direction of the plenum chamber.

14. The gas generator according to claim 10, wherein
the first through hole is formed at a center of the base plate portion.

* * * * *